3,751,486
ALKYL-SUBSTITUTED UNSATURATED ACETALS

Alfred A. Schleppnik, St. Louis, Mo., and John B. Wilson, North Brunswick, N.J., assignors to Monsanto Company, St. Louis, Mo.
No Drawing. Filed Dec. 9, 1970, Ser. No. 96,584
Int. Cl. C07c 43/30
U.S. Cl. 260—615 A                    6 Claims

ABSTRACT OF THE DISCLOSURE

Alkyl-substituted unsaturated acetals of the formula

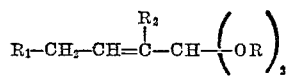

wherein R, $R_1$ and $R_2$ represent lower alkyl groups, are prepared by reacting an alpha, beta-unsaturated aldehyde with a lower alkanol in the presence of the corresponding alkyl ester selected from the group consisting of trialkyl orthoformates, tetraalkyl orthosilicates and dialkyl sulfites and a catalytic amount of ammonium nitrate. The compounds have very pleasant strong green, floral, woody odors and are useful as components in fragrance compositions.

---

This invention relates to the art of fragrance compositions and, more particularly, to a novel class of compounds possessing a characteristic odor. More specifically, this invention is directed to a novel class of useful unsaturated acetals, their preparation and the utility of these compounds as fragrances.

The art of perfumery began, perhaps, in the ancient cave dwellings of prehistoric man. From its inception, and until comparatively recently, the perfumer has utilized natural perfume chemicals of animal and vegetable origin. Thus, natural perfume chemicals such as the essential oils, for example, oil of rose and oil of cloves, and animal secretions such as musk, have been manipulated by the perfumer to achieve a variety of fragrances. In more recent years, however, research perfume chemists have developed a large number of synthetic odoriferous chemicals possessing aroma characteristics particularly desired in the art. These synthetic aroma chemicals have added a new dimension to the ancient art of the perfumer, since the compounds prepared are usually of a stable chemical nature, are inexpensive as compared with the natural perfume chemicals and lend themselves more easily to manipulation than the natural perfume chemicals since such natural perfume chemicals are usually a complex mixture of substances which defy chemical analysis. In contrast thereto, the synthetic aroma chemicals possess a known chemical structure and may therefore be manipulated by the perfumer to suit specific needs. Accordingly, there is a great need in the art of fragrance compositions for new compounds possessing specific characteristic aromas.

In accordance with the present invention, there is provided a novel class of alkyl-substituted unsaturated acetals. The compounds of this invention are prepared by the reaction of an alpha, beta-unsaturated aldehyde with a lower alkanol in the presence of the corresponding alkyl ester selected from the group consisting of trialkyl orthoformates, tetraalkyl orthosilicates and dialkyl sulfites and a catalytic amount of an ammonium nitrate. The class of compounds as a whole exhibit characteristic and pleasant green, floral, woody aromas which are highly useful in the preparation of fragrance compositions and perfumed products.

The principal object of the present invention is to provide a new class of aroma chemicals consisting of alkyl-substituted unsaturated acetals and to methods of preparing same.

Another object of the present invention is to provide a specific class of unsaturated acetal compounds having a characteristic aroma which is utilized in the preparation of fragrances and fragrance compositions.

These and other objects, aspects and advantages of this invention will become apparent from a consideration of the accompanying specification and claims.

In accordance with the above objects, there is provided by the present invention a novel class of compounds characterized by the formula

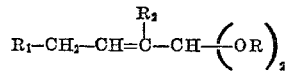

wherein R, $R_1$ and $R_2$ represent the same or different lower alkyl groups, i.e., an alkyl group of from 1 to 5 carbon atoms.

Representative alkyl groups characterized by R, $R_1$ and $R_2$ of the above formula include methyl, ethyl, n-propyl, i-propyl, n-butyl, i-butyl, tert-butyl, n-amyl, i-amyl, tert-amyl and the like.

The novel compounds of this invention are prepared by reacting an alpha, beta-unsaturated aldehyde characterized by the formula

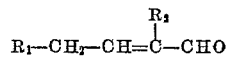

wherein $R_1$ and $R_2$ represent the same or different lower alkyl groups of from 1 to 5 carbon atoms, e.g., methyl, ethyl, propyl, butyl, amyl and the like as described hereinbefore, with a lower alkanol, such as methanol. Such a reaction is illustrated by the following equation:

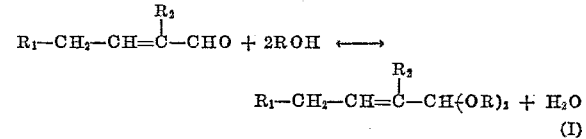

(I)

The above reaction is reversible so that it is necessary to either remove the water formed or chemically bind it so as to prevent the reverse reaction. It has been discovered that the latter can be done by carrying out the above reaction in the presence of the corresponding alkyl ester selected from the group consisting of trialkyl orthoformates, tetraalkyl orthosilicates and dialkylsulfites. The term "corresponding alkyl esters" refers to those above named esters wherein the alkyl moieties of the ester correspond to the alkanol that is reacted with the alpha, beta-unsaturated aldehydes. In this secondary reaction the water formed in reaction I reacts with the corresponding alkyl ester to form the alkanol and an ester with less alkyl moieties. Such a reaction is illustrated by the following equation (the illustrative ester is the orthoformate ester):

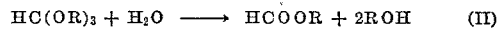

$$HC(OR)_3 + H_2O \longrightarrow HCOOR + 2ROH \qquad (II)$$

Obviously one could use alkyl esters that do not correspond to the alkanol utilized if one desired mixtures of acetals but this would present recovery problems.

The reactions should also be carried out in the presence of a catalytic amount of ammonium nitrate. Surprisingly, it has been found that other catalysts, such as strong mineral acids, do not effectively catalyze this reaction whereas catalytic amounts of ammonium nitrate provide excellent results.

The alpha,beta-unsaturated aldehydes described above include compounds such as 2-methylpent-2-en-1-al, 2-ethylhex-2-en-1-al, 2-n-propylhept-2-en-1-al. Other alpha, beta-unsaturated aldehydes wherein $R_1$ and $R_2$ are different include 2-ethylpent-2-en-1-al, 2 - propylhex-2-en-1-al, 2-n-butylhept-2-en-1-al, 2-n-amyloct-2-en-1-al and the like.

Representative lower alkanols which are utilized in accordance with this invention include methanol, ethanol, propanol, i-propanol, butanol, i-butanol, tert-butanol, n-amyl, i-amyl, tert-amyl and the like.

In a preferred embodiment of this invention, the alpha, beta-unsaturated aldehyde is reacted with a lower alkanol, such as methanol, in the presence of the corresponding trialkyl orthoformate, such as trimethyl orthoformate. Alternatively, the alkanol can be ethanol the corresponding alkyl ester being triethyl orthoformate and the like.

Ordinarily the mixture of the aldehyde, alkanol, ester and ammonium nitrate catalyst is refluxed for varying lengths of time to afford the product of this invention. However, the reaction conditions are not critical but should be such as to facilitate the preparation of the product. Normally elevated temperatures are preferred in carrying out the reaction; thus the reaction should normally be conducted at temperatures such as from about 80° C. to about 150° C.

The aldehyde and the alkanol which are reacted in accordance with this invention are preferably reacted in a mole ratio from about 1 to .5 to about 1 to 2; however, the mole ratio may be from about 1 to .1 to about 1 to 20 and still be satisfactory.

The ester should be present in at least equimolar amounts based on the amount of aldehyde present.

The amount of ammonium nitrate catalyst included in the reaction is from about 1 gram to 10 grams per mole of aldehyde present. Obviously the amount of catalyst added depends on the particular reactants and the specific reaction conditions employed.

The novel compounds of this invention are useful in the preparation and formulation of fragrance compositions such as perfumes and perfumed products due to their pleasing green, floral and woody aromas. Perfume compositions and the use thereof in cosmetic, detergent and bar soap formulations and the like are exemplary of the utility thereof.

The compounds of this invention are used in concentrations of from trace amounts up to about 50 percent of the perfume composition into which they are incorporated. As will be expected, the concentration will vary depending on the particular fragrance composition and even within the same composition when compounded by different perfumers.

The following examples will serve to illustrate certain specific embodiments within the scope of this invention and are not to be construed as limiting the scope thereof.

EXAMPLE 1

1,1-dimethoxy-2-ethyl-2-hexene

To a refluxing solution of 2.0 grams of ammonium nitrate in 100 ml. of anhydrous methanol were added, with good agitation, a mixture of 63.1 grams (0.5 mole) of 2-ethyl-2-hexenal and 63.6 grams (0.6 mole) or trimethylorthoformate. The resulting mixture was refluxed for 16 hours.

The reaction mass was allowed to cool to room temperature and was then poured into 250 ml. of a 2%, by weight, sodium carbonate solution. The resulting solution was extracted twice with benzene. The benzene extract was washed once with water, once with a saturated sodium chloride solution and dried over magnesium sulfate.

The benzene was distilled off resulting in a product that had a boiling point of about 36–37° C. at 0.35 mm. Hg, $n_D^{25} = 1.4315$ and upon analysis was found to be 1,1-dimethoxy-2-ethyl-2-hexene.

EXAMPLE 2

1,1-dimethoxy-2-n-butyl-2-octene

To a mixture of 35.6 grams of 2-n-butyloct-2-en-1-al (0.195 mole), 21.2 grams (0.20 mole) of trimethylorthoformate and 30 ml. of methanol was added a hot solution of 0.8 gram ammonium nitrate and 10 ml. of methanol. The resulting mixture was heated to reflux for three hours.

The solution turned greenish and then amber after three hours.

Gas-liquid chromatography demonstrated that almost all of the starting material had been consumed. The mixture was allowed to cool to room temperature, treated with 100 ml. of 2%, by weight, sodium carbonate solution and the organic material was extracted with benzene. The resulting benzene extract solution was washed with water and concentrated sodium chloride solution followed by drying over sodium sulfate. The solvent was removed by distillation and the residue distilled through a short column.

The resulting product had a boiling point of about 77–79° C. at 0.7 mm. of mercury, $n_D^{25} = 1.9406$. The yield of the product was 36.13 grams or about 79%. Upon analysis the product was determined to be 1,1-dimethoxy-2-n-butyl-2-octene.

EXAMPLE 3

1,1-dimethoxy-2-n-propyl-2-heptene

To a mixture of 30.8 grams (0.2 mole) of 2-n-propyl-hept-2-en-1-al and 26.0 grams of trimethylorthoformate was added a warm solution of 0.8 gram ammonium nitrate and 10 grams of anhydrous methanol. A fine slurry was formed which was heated to reflux for three hours.

The color of the reaction mass changed to yellow and then to amber but gas-liquid chromatography and I.R. showed that not much acetylization had taken place. Enough methanol was then added to obtain a homogeneous solution and refluxing was continued for six more hours, and then the mixture was allowed to sit for twenty-four hours at room temperature. The resulting reaction mass was then poured into dilute sodium bicarbonate solution followed by extracting the organic materials with ether. The ether extract was washed with water and dried over sodium sulfate. The solvent was removed by distillation and the residue distilled through a short column.

The product was an amber colored liquid which had a boiling point of about 86–87° C. at 6 mm. of mercury, $n_D^{25} = 1.4392$. Upon analysis it was determined that the product was 1,1-dimethoxy-2-n-propyl-2-heptene.

While this invention has been described hereinabove with regard to certain illustrative specific embodiments, it is not so limited since many modifications and variations are possible in the light of the above teachings. It is understood therefore that the invention may be practiced otherwise than as specifically described without departing from the spirit and scope of the invention.

The embodiments of this invention in which an exclusive property or privilege is claimed are defined as follows:

1. A compound of the formula

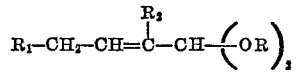

wherein R, $R_1$ and $R_2$ each represent a lower alkyl group.

2. A compound as defined in claim 1 wherein $R_1$ and $R_2$ represent the same lower alkyl group.

3. A compound as defined in claim 1 wherein $R_1$ and $R_2$ each represent a different lower alkyl group.

4. A compound as defined in claim 1 that is 1,1-dimethoxy-2-ethyl-2-hexene.

5. A compound as defined in claim 1 that is 1,1-dimethoxy-2-n-butyl-2-octene.

6. A compound as defined in claim 1 that is 1,1-dimethoxy-2-n-propyl-2-heptene.

References Cited

UNITED STATES PATENTS 3,381,039   4/1968   Marbet _____ 260—615 A UX (Other references on following page)

FOREIGN PATENTS 699,956 12/1964 Canada _____ 260—615 A
757,907 9/1956 Great Britain ____ 260—615 A

OTHER REFERENCES

Bedoukian, J. Am. Chem. Soc., 79, pp. 889–892 (1957).
Nazarov et al., Zhur. Obshchei Khim. 29, 106–11 (1959).
Ward et al., Recueil (1967), 86, p. 553.
Asselineau et al., Bull. Soc. Chim. de France, Series 5, (1960), pp. 1776, 1780.

HOWARD T. MARS, Primary Examiner

U.S. Cl. X.R.

262—522